(12) United States Patent
Wallrabe et al.

(10) Patent No.: US 12,524,278 B2
(45) Date of Patent: Jan. 13, 2026

(54) OFFLOADING A WORKLOAD IN A RESOURCE-CONSTRAINED ENVIRONMENT

(71) Applicant: Red Hat, Inc., Raleigh, NC (US)

(72) Inventors: Paul Wallrabe, Grasbrunn (DE); Pierre-Yves Chibon, Puteaux (FR)

(73) Assignee: Red Hat, Inc., Raleigh, NC (US)

( * ) Notice: Subject to any disclaimer, the term of this patent is extended or adjusted under 35 U.S.C. 154(b) by 10 days.

(21) Appl. No.: 18/765,933

(22) Filed: Jul. 8, 2024

(65) Prior Publication Data

US 2026/0010412 A1    Jan. 8, 2026

(51) Int. Cl.
*G06F 9/50* (2006.01)
*G06V 10/82* (2022.01)
*H04W 4/44* (2018.01)

(52) U.S. Cl.
CPC ............ *G06F 9/5072* (2013.01); *G06V 10/82* (2022.01); *H04W 4/44* (2018.02)

(58) Field of Classification Search
CPC .................. G06F 9/5072; G06V 10/82; H04L 2012/40215; H04L 2012/40273; H04L 41/0895; H04L 41/5009; H04L 41/5019; H04L 63/20; H04L 67/10; H04L 67/12; H04L 67/125; H04L 67/34; H04W 24/02; H04W 24/08; H04W 4/40; H04W 4/44; H04W 4/46; H04W 4/50; H04W 48/18; H04W 84/12
See application file for complete search history.

(56) References Cited

U.S. PATENT DOCUMENTS

| | | | |
|---|---|---|---|
| 2020/0178198 A1* | 6/2020 | Ding | H04W 60/04 |
| 2022/0171648 A1* | 6/2022 | Rodriguez | G06F 9/45533 |
| 2023/0318986 A1* | 10/2023 | Draznin | H04L 47/803 709/226 |

FOREIGN PATENT DOCUMENTS

CN    117061553 A    *    11/2023    ............ H04L 67/12

OTHER PUBLICATIONS

Walsh, Daniel, "How to run systemd in a container," redhat.com, https://developers.redhat.com/blog/2019/04/24/how-to-run-systemd-in-a-container#, Apr. 24, 2019, 4 pages.
Author Unknown, "GitHub—eclipse-bluechi/bluechi," GitHub.com, https://github.com/eclipse-bluechi/bluechi, accessed online Mar. 10, 2023, 4 pages.
Author Unknown, "gRPC," https://grpc.io, accessed online Mar. 10, 2023, 3 pages.

* cited by examiner

*Primary Examiner* — Christopher Biagini
(74) *Attorney, Agent, or Firm* — Dority & Manning, P.A.

(57) ABSTRACT

A first network node can start, while executing a first operating system, a first systemd System and Service Manager (SSM) for the first operating system. A first set of computing resources currently available to the first network node can be determined to lack a particular computing resource to fulfill a particular workload. The first systemd SSM can be used to establish an encrypted channel to a systemd bus Application Programming Interface (API). A second network node executing a second operating system that has the particular computing resource to fulfill the particular workload can be identified. Configuration information can be provided to the second network node via the encrypted channel, wherein the configuration information is indicative of at least a portion of the particular workload to be fulfilled with the particular computing resource.

20 Claims, 4 Drawing Sheets

OFFLOADING A WORKLOAD IN A RESOURCE-CONSTRAINED ENVIRONMENT

BACKGROUND

A resource-constrained environment is a computing environment where computing resources are limited. As a result, executing certain tasks or applications in a resource-constrained environment at the edge of a computing network may be challenging.

SUMMARY

The examples disclosed herein implement a service and system manager of an operating system for offloading a workload in a resource-constrained environment. In particular, a system and service manager of an operating system, such as systemd which can start processes from unit files, can be started during execution of the operating system. A workload of the computing device of the operating system, such as a task or application, may need additional computing resources that are not available on the computing device but are available on an external system. The system and service manager can be used to offload that workload to the external system that has the additional computing resources needed for the workload.

In one example, a method for offloading a workload in a resource-constrained environment is provided. The method includes starting, by a first network node executing a first operating system, a first systemd System and Service Manager (SSM) for the first operating system. The method further includes determining, by the first network node, that a first set of computing resources currently available to the first network node lacks a particular computing resource to fulfill a particular workload. The method further includes using, by the first network node, the first systemd SSM of the first operating system to establish an encrypted channel to a systemd bus Application Programming Interface (API). The method further includes identifying, by the first network node via the encrypted channel, a second network node executing a second operating system that has the particular computing resource to fulfill the particular workload, wherein the second network node is connected to the systemd bus API via a second systemd SSM of the second operating system. The method further includes providing, by the first network node, configuration information to the second network node via the encrypted channel, wherein the configuration information is indicative of at least a portion of the particular workload to be fulfilled with the particular computing resource.

In another example, a first network node for offloading a workload in a resource-constrained environment is provided. The first network node includes a memory and a processor device coupled to the memory. The processor device is to start, while executing a first operating system, a first systemd SSM for the first operating system. The processor device is further to determine that a first set of computing resources currently available to the first network node lacks a particular computing resource to fulfill a particular workload. The processor device is further to use the first systemd SSM of the first operating system to establish an encrypted channel to a systemd bus API. The processor device is further to identify, via the encrypted channel, a second network node executing a second operating system that has the particular computing resource to fulfill the particular workload, wherein the second network node is connected to the systemd bus API via a second systemd SSM of the second operating system. The processor device is further to provide configuration information to the second network node via the encrypted channel, wherein the configuration information is indicative of at least a portion of the particular workload to be fulfilled with the particular computing resource.

In another example, a non-transitory computer-readable storage medium for offloading a workload in a resource-constrained environment is provided. The non-transitory computer-readable storage medium includes computer-executable instructions to cause a processor device of a first network node to start, while executing a first operating system during a boot process of the operating system, a first systemd SSM for the operating system. The instructions are further to cause the processor device of the first network node to determine that a first set of computing resources currently available to the first network node lacks a particular computing resource to fulfill a particular workload. The instructions are further to cause the processor device of the first network node to use the first systemd SSM of the first operating system to establish an encrypted channel to a systemd bus API. The instructions are further to cause the processor device of the first network node to identify, via the encrypted channel, a second network node executing a second operating system that has the particular computing resource to fulfill the particular workload, wherein the second network node is connected to the systemd bus API via a second systemd SSM of the second operating system. The instructions are further to cause the processor device of the first network node to provide configuration information to the second network node via the encrypted channel, wherein the configuration information is indicative of at least a portion of the particular workload to be fulfilled with the particular computing resource.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the elements unless otherwise explicitly specified. The word "or" as used herein and in the claims is inclusive unless contextually impossible. As an example, the recitation of A or B means A, or B, or both A and B. The word "data" may be used herein in the singular or plural depending on the context.

A resource-constrained environment is a computing environment where computing resources are limited. As a result, executing certain tasks or applications in a resource-constrained environment at the edge of a computing network may be challenging.

The examples disclosed herein implement a service and system manager of an operating system for offloading a workload in a resource-constrained environment. Specifically, a system and service manager (SSM) (e.g., systemd, etc.), which can start processes from unit files, can be started while executing the operating system (e.g., during the boot process for the operating system of a computing device, etc.). A workload of the computing device, such as a task or application, may need additional computing resources that are not available on the computing device but are available on an external system. The system and service manager can be used to offload that workload to the external system that has the additional computing resources needed for the workload.

More specifically, in resource-constrained environments, computing resources (e.g., compute cycles, memory, storage, etc.) are limited due to hard physical constraints (e.g., thermal constraints, weight requirements, etc.). In many instances, resource-constrained environments include sufficient computing resources to accomplish the tasks for which they are designed. For example, a tablet computing device generally includes a quantity of computing resources sufficient to execute an operating system and any applications compatible with the operating system at the time the system is designed.

Historically, computing resource capabilities (e.g., bandwidth, throughput, etc.) have increased substantially in relatively short time-frames. For example, it is not uncommon for a new generation of Central Processing Units (CPUs) or Graphics Processing Units (GPUs) to exhibit performance increases of 30% (or higher) in comparison to a preceding generation released only a few years beforehand. When compounded across multiple generations of computing resources, this rapid pace of development leads to cutting-edge computing devices being orders of magnitude more powerful than preceding devices. For example, the CPU included in the 2020 version of a flagship smartphone model is likely to be at least twice as fast as the CPU included in the 2017 model.

These rapid increases in computing resource capabilities have historically been matched by the resource requirements of cutting edge software. In other words, as the capabilities of computing resources increase, software is created or updated to fully utilize existing computing resources. In some instances, the increased capabilities of computing resources enable new types of software. For example, the development of mobile processor devices sufficiently powerful to drive neural networks has led to a proliferation in mobile applications that utilize machine learning technologies. For another example, the increased throughput capabilities of GPUs have enabled the development of autonomous vehicle technologies.

However, software that requires computing resource capabilities only present in cutting-edge devices cannot be utilized by older devices without those resource capabilities. For example, recent smartphone applications utilize new types of processor devices (e.g., a tensor core, etc.) to enable machine-learning applications, and as such, cannot be utilized by models released in previous years without those types of processor devices. Furthermore, even when applications do not require a particular type of computing resource capability, it is relatively common for the computing resource requirements of an application to increase substantially over time as the application is iteratively updated to add new features.

This manner of rapid obsolescence is not substantially disruptive in areas of technology where users regularly upgrade or replace computing devices with newly released versions (e.g., consumer electronics, smartphones, laptops, etc.). However, in other areas of technology where devices are more difficult or expensive to replace, such obsolescence can be severely disruptive. For example, autonomous or Software-Defined Vehicles (SDVs) are manufactured with a particular quantity of Graphics Processing Units (GPUs) or the like for machine-learned model inference (e.g., computer vision, etc.). However, if future machine-learned models require substantially more computing resources for inference, the SDV may be rendered obsolete or non-functional due to the prohibitively high cost of adding additional computing resources to SDVs.

Some device makers attempt to mitigate this problem by building devices with more computing resources than necessary. Such development practices can be prohibitively expensive, however, and in many instances fail to properly estimate the pace of future development. As such, a technique to enable devices with insufficient computing resources to utilize cutting edge software is greatly desired.

Accordingly, implementations described herein propose workload offloading in resource-constrained environments. More specifically, a network node (e.g., autonomous vehicles or Software-Defined Vehicles (SDVs), a user computing device, a virtualized compute node, etc.) can execute a first operating system. While executing the operating system, the computing device can start a first System and Service Manager (SSM), such as Linux systemd, for the operating system. The network node can determine that a first set of computing resources that is currently available to the network node lacks a particular computing resource to fulfill a particular workload. For example, assume that the network node is an autonomous vehicle that includes local Graphics Processing Units (GPUs), which are necessary to perform computer vision tasks. Further assume that the local GPUs are currently at full capacity with existing computer vision workloads, and cannot be used for an additional computer vision workload. In this instance, the network node can determine that the particular type of computing resource (e.g., GPUs) necessary to fulfill the workload (e.g., the additional computer vision workload) is not currently available to the network node.

The network node can use the systemd SSM of the operating system to establish an encrypted channel to a systemd bus API. The systemd bus API can be an API to handle inter-process communication between processes connected to the systemd bus API. In addition, the systemd bus API can be an extended API that is extended to represent other nodes with available computing resources as processes. Such nodes can offer services, or resources, as "objects" that can be selected by the network node via the systemd bus API. In this manner, the systemd bus API can enable distributed processing of workloads based on available computing resources.

Using the systemd bus API, the network node can identify a second network node executing a second operating system that has the particular computing resource to fulfill the particular workload. To follow the previous example, if the network node requires GPU resources for a workload, the network node can identify the second network node based on the second network node having GPU resources available. For example, the second network node can expose an object within the systemd bus API indicating available computing resources (e.g., type, quantity, availability duration, etc.). The network node can use the encrypted channel to interact with the object exposed by the second network node. The network node's interaction with the exposed object via the encrypted channel can identify the second network node as having GPU resources available.

Upon identifying the second network node, the network node can provide configuration information to the second network node via the encrypted channel. The configuration information can be indicative of at least a portion of the workload to be fulfilled with the particular computing resource. For example, if a portion of the workload includes a computer vision task, that portion of the workload can be indicated by the configuration information. Further, in some implementations, the workload can include or otherwise describe instructions to fulfill the portion of the workload. To follow the previous example, the configuration information can include or otherwise indicate a particular machine-learned model to be utilized, parameters for the model, the model itself, etc.

Aspects of the present disclosure provide a number of technical effects and benefits. As one example, implementations described herein can substantially improve the effective lifespan of computing devices and network nodes. For example, as described previously, rapid developments in computing resource technology (e.g., new processor manufacturing processes, new processor architectures, new generations of random access memory, etc.) can drive rapid obsolescence of network nodes and computing devices. For some devices, such as software-defined vehicles, obsolescence is unacceptable prohibitive difficulty in updating existing devices and/or acquiring new devices. However, implementations described herein enable existing devices and nodes to communicate with other devices and nodes to distribute workloads based on computing resource availability. By enabling workload distribution to other devices or nodes, the present implementations can functionally increase the computing resources available to existing devices and nodes, therefore substantially delaying the onset of obsolescence.

Figure 1:
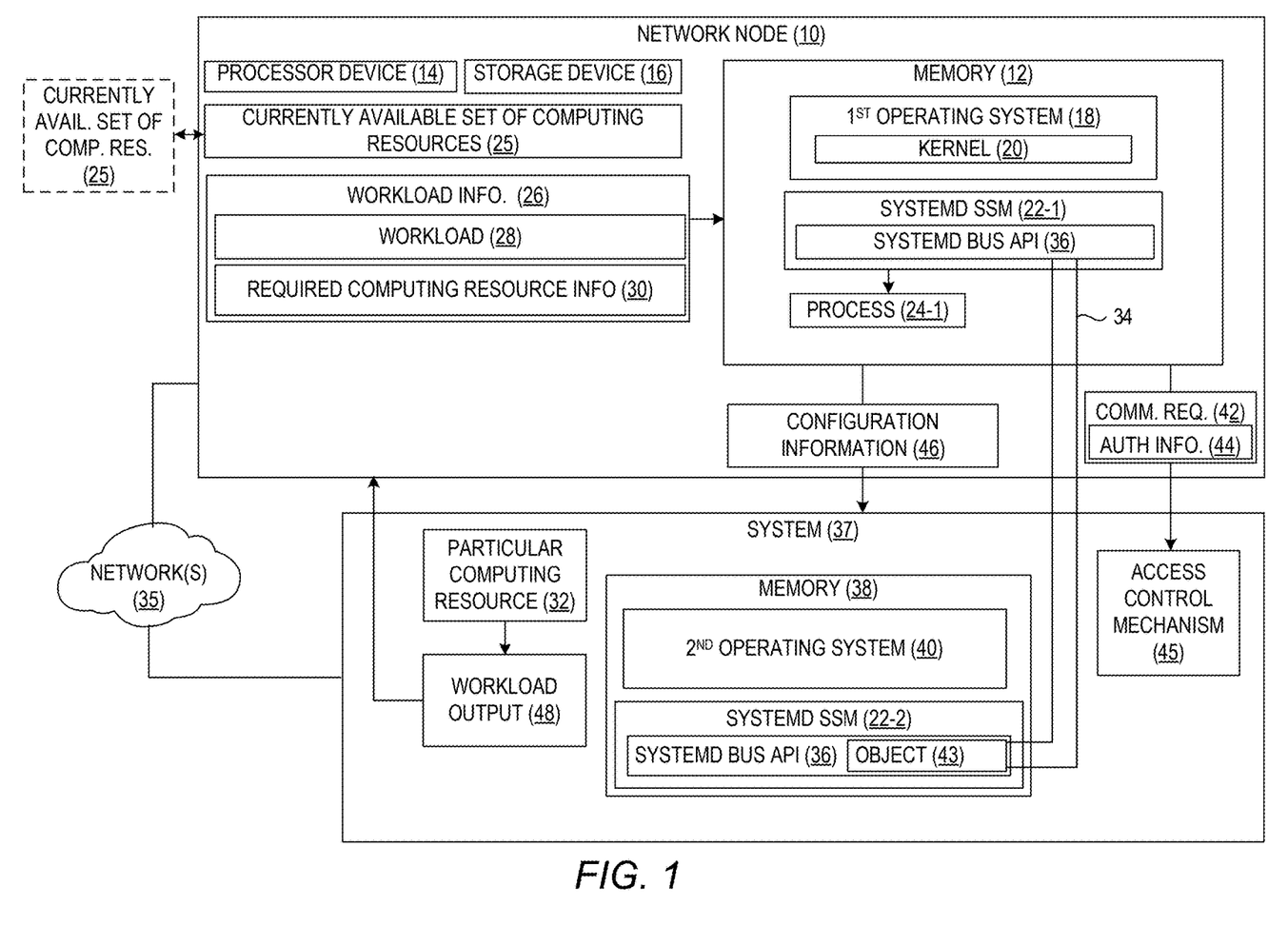
FIG. 1 is a block diagram of a network node that comprises a system memory, a processor device, and a storage device in which examples of offloading a workload in a resource-constrained environment may be practiced.

FIG. 1 is a block diagram of a network node 10 that comprises a system memory 12, a processor device 14, and a storage device 16 in which examples of offloading a workload in a resource-constrained environment may be practiced. The network node 10 can be any type or manner of computing device or network node, and can include physical computing device(s) (e.g., Central Processing Units (CPUs), Graphics Processing Units (GPUs), memory, accelerators, virtualized device(s) or service(s), etc. For example, the network node 10 can be a virtualized node within a cloud-based computing environment that has indirect access to computing resources through a virtualization layer. For another example, the network node 10 can be an autonomous or software-defined vehicle with onboard computing resources (e.g., CPUs, GPUs, etc.). It is to be understood that the network node 10 in some examples may include constituent elements in addition to those illustrated in FIG. 1. In the example of FIG. 1, the network node 10 implements a first operating system with a kernel 20 that performs offloading a workload in a resource-constrained environment. It should be noted that, although the operating system 18 is illustrated as a kernel-based operating system with a kernel 20, such as a Linux operating system, the operating system 18 can also be an operating system without a kernel. As described herein, a "kernel-based" operating system generally refers to an operating system that includes a "kernel," which is a component of the operating system that, among other functionality, controls access by application programs to various hardware devices of a computing device, such as a processor device and a memory.

While executing the first operating system 18, a first systemd System and Service Manager (SSM) 22-1 for the first operating system 18 can be started. For example, the first system SSM 22-1 may be started during the boot process of the first operating system 18 alongside performance of other various boot operations (e.g., start with a basic input/output system (BIOS) performing start up tasks, performing integrity checks, and loading and executing a boot loader, etc.). The execution of the boot loader can include loading the kernel 20 of the first operating system 18. The kernel 20 can set up components of the network node 10 and then separately start the init process (i.e., the initial process). The first systemd SSM 22-1 (i.e., the init process) can be systemd, a system and service manager that can manage the system, the services of the system, and the processes of the system, interface between applications and the kernel, mount filesystems, and perform other actions to manage the components of the network node 10 running the first operating system 18 based on the Linux operating system. Systemd can start unit files that define how systemd handles a unit (e.g., a resource, such as an application or service) that corresponds to the unit file, such as starting a unit file that starts a service. The unit files that systemd can access may be found in various locations, such as in directories in the root filesystem or root volume, and can contain instructions on how systemd can start or manage a resource, such as instructions for starting a particular service. The first systemd SSM 22-1 can start an initial process 24-1 during the boot process of the first operating system 18.

The network node 10 can include a set of currently available computing resources 25 that are currently available to the network node 10. As described herein, a computing resource that is "currently available" refers to software and/or hardware resource(s) with sufficient capacity at a current time, or a near-future time (e.g., 5 seconds, 10 seconds, 1 minute, etc.), to fulfill workloads. For example, a GPU that currently with low or no utilization can be considered a computing resource that is currently available. For another example, an external database resource with available storage space can be considered a computing resource that is currently available.

In some implementations, the network node 10 can determine whether a computing resource is "currently available" with regards to a particular workload. To follow the previous example, assume that the GPU is at 30% utilization while performing a relatively low-complexity workload. Further assume that the workload is bottlenecked by another resource (e.g., a CPU), and as such, the GPU will remain at 30% utilization for an extended period of time. If a workload requires 100% GPU utilization to fulfill, the GPU can be considered to be a currently unavailable computing resource, as 100% of the GPU cannot be utilized at the current time or a near-future time to fulfill the workload.

The network node 10 can obtain workload information 26. The workload information 26 can describe a workload 28 to be fulfilled by the network node 10. In some implementations, the workload information 26 can be generated by the network node 10. For example, assume that the first operating system 18 executes a process for an application that performs computer vision tasks. To perform the computer vision tasks, the process can perform operations using computing resources, such as the set of currently available computing resources 25. The first operating system 18 can generate the workload information 26 to describe the operations and corresponding computing resources necessary to fulfill the operations.

It should be noted that the set of currently available computing resources 25 can change rapidly as workload requests are obtained and fulfilled by the network node 10. For example, fulfillment of a data storage workload request may require 100% utilization of network bandwidth available to the network node 10. However, once fulfillment is complete, network bandwidth utilization may reduce from 100% to 0%. As such, the network node 10 can regularly determine, evaluate, and/or update the set of currently available computing resources 25 so that workload requests can be properly fulfilled.

Alternatively, in some implementations, the network node 10 can obtain the workload information from another node, device, or system. For example, assume that the network node 10 is a user computing device. Further assume that a user of the user computing device is also wearing a wearable Augmented Reality (AR)/Virtual Reality (VR) device that offloads some (or all) processing to the network node 10. The wearable AR/VR device can provide the workload information 26 to the network node 10 so that the network node 10 can fulfill the workload.

In particular, the workload information 26 can include required computing resource information 30. The required computing resource information 30 can indicate a type, quantity, and/or other characteristics of computing resources to fulfill the workload 28. In some implementations, the required computing resource information 30 can indicate a plurality of candidate computing resources that are each capable of being utilized to fulfill a particular workload. Additionally, or alternatively, in some implementations, the required computing resource information 30 can indicate that a specific type of computing resource, and/or quantity of computing resources, is necessary to fulfill a particular workload.

For example, if the workload 28 is a computer vision workload, the required computing resource information 30 can describe the computing resources to fulfill the computer vision workload, such as GPUs, CPUs, etc. Additionally, in some implementations, the required computing resource information 30 can describe necessary characteristics of computing resources necessary to fulfill the workload 28 (e.g., a particular type of GPU, a particular firmware version for a device, a particular bandwidth or throughput quantity, etc.

For example, assume that a workload requires parallelized graphics processing to fulfill. The required computing resource information 30 may indicate different types of computing resources that are capable of parallelized graphics processing, albeit with varying efficacy (e.g., CPUs, GPUs, etc.). If the workload must be completed in a particular amount of time, the required computing resource information 30 may specify a particular type or model of computing resource (e.g., a "minimum" GPU model, etc.). In some implementations, rather than describing a particular type and/or quantity of GPU necessary to fulfill a workload, the required computing resource information 30 can describe necessary computing resources in terms of performance metrics (e.g., Floating Point Operations Per Second (FLOPS), etc.).

Based on the required computing resource information 30, the network node 10 can determine that a particular computing resource 32 to fulfill the workload 28. The network node 10 can further determine that the set of currently available computing resources 25 lacks the particular computing resource 32. For example, the network node 10 may be executing a service, application, or tasks (i.e., the workload 28) which may require the particular computing resource 32). The network node 10 can determine whether the set of currently available computing resources 25 includes the particular computing resource 32. In other words, the network node 10 can determine whether the particular computing resource 32 exists within the network node 10 (e.g., as a local or locally accessible device), and if so, whether the particular computing resource 32 is currently available.

If the network node 10 determines that the particular computing resource 32 is unavailable, the network node 10 can use the first systemd SSM 22-1 to establish an encrypted channel 34 to a systemd bus Application Programming Interface (API) 36 via a network 35. The systemd bus API 36 can be an API to handle inter-process communication between processes connected to the systemd bus API 36. In addition, the systemd bus API 36 can be an extended API that is extended to represent other nodes with available computing resources as processes. Such nodes can offer services, or resources, as "objects" that can be selected by the network node via the systemd bus API. In this manner, the systemd bus API can enable distributed processing of workloads based on available computing resources. In some implementations, the network 35 can be a public network. As such, the encrypted channel 34 can protect against interception of communications transmitted over the public network.

More specifically, a computing system 37 can be a system that is connected (directly or indirectly) to the network node 10. The computing system 37 can be another network node within the same network as the network node 10, a network node external to the network that includes the network node 10, a publicly accessible computing device, a computing device that belongs to a user of the network node 10, a cloud computing service, a physical or virtualized resource within a cloud computing environment, etc. For example, the computing system 37 can be a managing network node that manages other network nodes including the network node 10.

The computing system 37 can include a memory 38 as described with regards to the system memory 12 of the network node 10. The computing system 37 can execute a second operating system. The second operating system 40 can be another instance of the same operating system as the first operating system 18, or may be a different operating system or type of operating system. For example, the first operating system 18 can be a kernel-based operating system while the second operating system 40 lacks a kernel. The second operating system 40 can include a second systemd SSM 22-2.

In some implementations, the computing system 37 can be an abstract node representation of a variety of distributed network nodes or compute nodes accessible to the network node 10. For example, assume that virtualized instances, such as a set of virtual machines, are instantiated within the network environment. The set of virtual machines can each have different computing resource availability. The computing system 37 can be a logical representation of the computing resources collectively available to the set of virtual machines.

The first systemd SSM 22-1 and the second systemd SSM 22-2 can both be used to establish an encrypted channel 34 to the systemd bus API 36. The systemd bus API 36 can be an inter-process communication API that represents the network node 10 and computing system 37 as separate processes. The computing system 37 can expose an object 43 within the systemd bus API 36. The object 43 can indicate the availability of the particular computing resource 32, among other computing resources of the computing system 37. For example, the object 43 can emit a "signal" (e.g., a system bus API signal). The emitted signal can be received by the network node 10 indicating availability of the particular computing resource 32.

The encrypted channel 34 can carry information to the systemd bus API 36 using any type or manner of encryption schema. In some implementations, the network node 10 can provide a communication request 42 to the computing system 37. The communication request 42 can include authenticating information 44 that authenticates or otherwise identifies the network node 10. For example, the authenticating information 44 can include a private key shared previously to the network node 10, a hash value, an identifier (e.g., a Media Access Control (MAC) address, a hardware ID, etc.), etc. Based on the authenticating information 44, the computing system 37 can facilitate establishment of the encrypted channel 34 between the network node 10 and the systemd bus API 36.

In some implementations, the network node 10 can access an access control mechanism 45 of the computing system 37. The access control mechanism 45 can mediate access to the systemd bus API 36 based on an identity of the network node 10, such as through authentication or access control policies that include permissible actions for the network node 10 or users. The access control mechanism 45 can determine that the network node 10 has the permissions that are needed to access and use the particular computing resource 32, and/or the systemd bus API 36. For example, the access control mechanism 45 can determine whether the authenticating information 44 matches authentication records stored by the access control mechanism 45. Based on whether the authenticating information 44 can be verified, the access control mechanism 45 can determine whether to grant access to the network node 10.

It should be noted that the systemd bus API 36 is illustrated as a component of the systemd SSM only to more clearly illustrate various implementations of the present disclosure. In some implementations, the systemd bus API 36 can be an API for a logical systemd bus (e.g., "D-bus") that is locally instantiated by each of the systemd SSMs 22 (e.g., first systemd SSM 22-1 and second systemd SSM 22-2). The locally instantiated systemd bus APIs 36 can collectively facilitate a peer-to-peer connection between the systemd SSMs 22.

In some implementations, the systemd bus API 36 may only be implemented by the second systemd SSM 22-2. The first systemd SSM 22-1 can connect to the systemd bus API implemented by the second systemd SSM 22-2 by establishing the encrypted channel 34. Alternatively, in some implementations, the systemd bus API 36 can be implemented, maintained, etc. by a separate device or system.

The network node 10 can identify the computing system 37 as having the particular computing resource 32 to fulfill the workload 28. TO do so, the first systemd SSM 22-1 of the network node 10 can ping, "scan," or otherwise identify devices connected to the systemd bus API that may posses the particular computing resource 32. For example, the second systemd SSM 22-2 of the computing system 37 can expose an object 43 within the systemd bus API 367. The object 43 can include a bus name and an object path. The bus name of the object 43 can uniquely identify the computing system 37, and the object path can uniquely identify the computing resources currently available to the computing system 37, including the particular computing resource 32.

The network node 10 can interact with the exposed object 43 via the encrypted channel 34 to identify the computing system 37 as having the particular computing resource 32. The network node 10 can further determine that the particular computing resource 32 is currently available in the same manner.

In response to the particular computing resource 32 being available on the computing system 37, the network node 10 can provide configuration information 46 to the computing system 37 via the encrypted channel 34. The configuration information 46 can indicate at least a portion of the workload 28 to be fulfilled with the particular computing resource 32. For example, assume that a portion of the workload 28 is a computer vision task that requires GPU resources, and that the particular computing resource 32 is a GPU. The configuration information 46 can include images to be processed for the computer vision workload. Alternatively, the configuration information 46 may indicate a file location from which the images can be retrieved. In some implementations, the configuration information 46 can also include or otherwise indicate particular workload parameters, processing steps, necessary software (e.g., libraries, packages, etc.), particular machine-learned model(s), etc.

For example, a particular type of machine-learned model (e.g., a computer vision model) may be required to perform the computer vision workload. The configuration information 46 can include the machine-learned model to be used, or a link to access or retrieve the model. Alternatively, the configuration information 46 can indicate a certain model or type of model to be used. Alternatively, the configuration information 46 can instruct the computing system 37 to utilize any type of conventional computer vision process.

In particular, the configuration information 46 can indicate, or otherwise cause the computing system 37 to perform, various processing steps to fulfill the portion of the workload referenced by the configuration information 46. For example, the computer vision portion of the workload 28 can require performance of a series of image processing steps (e.g., image pre-processing, image encoding, image decoding, etc.). The configuration information 46 can describe each step and, in some instances, various resources required to perform the steps (e.g., image encoding or decoding schemas, image pre-processing algorithms, etc.).

In some implementations, the configuration information 46 can be cloud configuration instructions provided to a cloud service. When executed, the cloud configuration instructions can cause the computing system 37 to instantiate a virtualized instance to fulfill the portion of the workload 28.

In some implementations, the object 43 exposed to the systemd bus API 36 can include certain methods (e.g., a computer vision method, etc.). These methods can be invoked to fulfill a portion of the workload 28 using the particular computing resource 32. For example, the configuration information 46 can invoke (or cause invocation of) a method of the object 43 that, when invoked, causes fulfillment of the corresponding portion of the workload 28.

In some implementations, fulfilling the portion of the workload 28 can include returning a workload output 48 to the network node 10. For example, assume that the workload 28 is a machine-learning workload (e.g., a machine-learned model training task, a machine-learned model inference task, etc.). The configuration information 46 can include or otherwise indicate the model itself, a set of training data to train the model, an optimization function, etc. The computing system 37 can utilize the particular computing resource 32 to fulfill the model training workload to obtain a workload output 48. The workload output 48 can include the trained machine-learned model. Alternatively, if the workload 28 includes a machine-learned model inference task, the workload output 48 can be a model output from the model. Alternatively, the workload output 48 may include differences between values of the parameters of the original model and the parameters of the trained model. In such fashion, the computing system 37 can complete fulfillment of the workload 28.

It is to be understood that, because the first systemd SSM 22-1 is a component of the network node 10, functionality implemented by the first systemd SSM 22-1 may be attributed to the network node 10 generally. Moreover, in examples where the first systemd SSM 22-1 comprises software instructions that program the processor device 14 to carry out functionality discussed herein, functionality implemented by the first systemd SSM 22-1 may be attributed herein to the processor device 14. It is to be further understood that while, for purposes of illustration only, the first systemd SSM 22-1 is depicted as a single component, the functionality implemented by the first systemd SSM 22-1 may be implemented in any number of components, and the examples discussed herein are not limited to any particular number of components.

Figure 2:
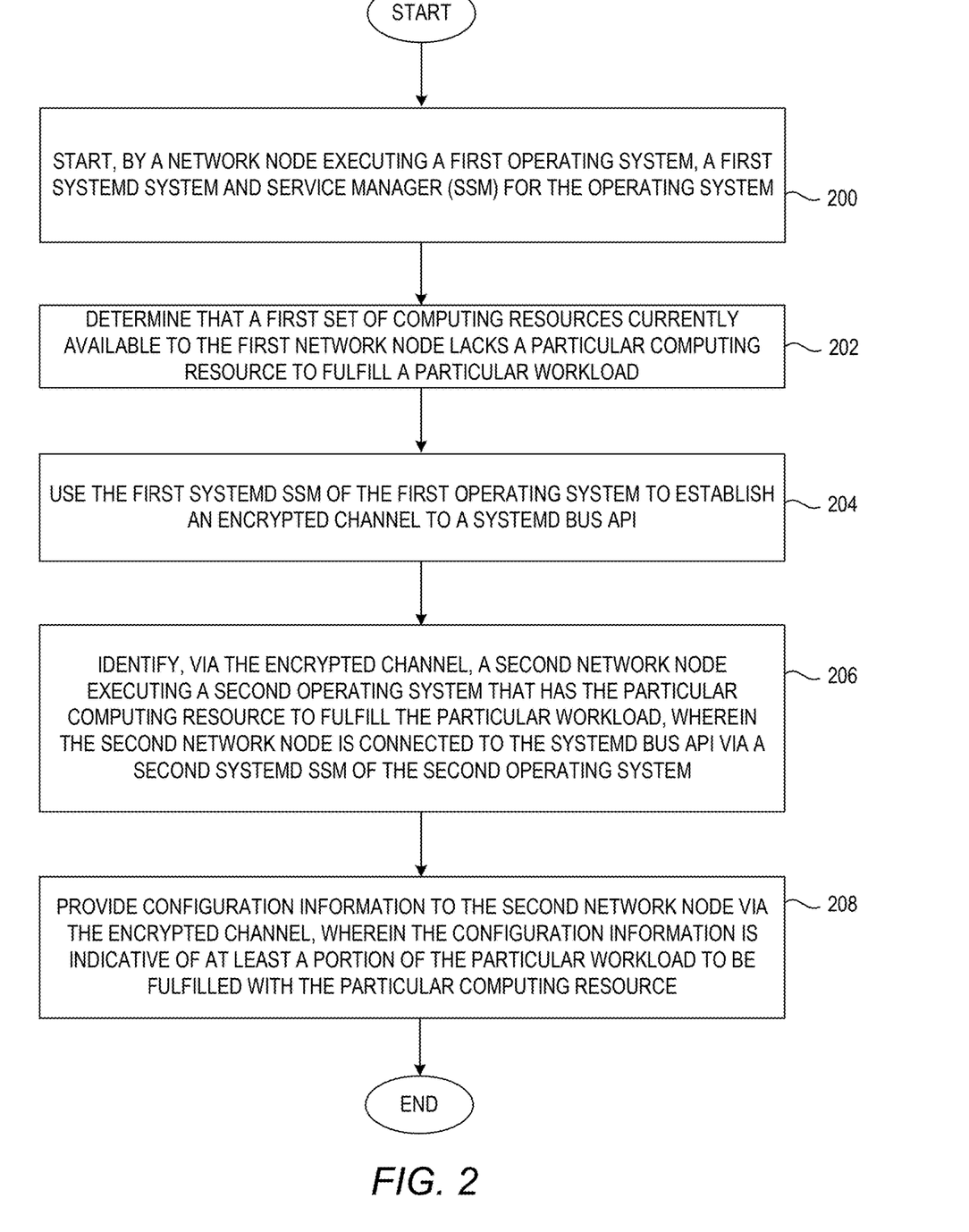
FIG. 2 is a flowchart illustrating operations performed by the computing device of FIG. 1 for offloading a workload in a resource-constrained environment, according to one example.

FIG. 2 is a flowchart illustrating operations performed by the computing device of FIG. 1 for offloading a workload in a resource-constrained environment, according to one example. Elements of FIG. 1 are referenced in describing FIG. 2 for the sake of clarity. In FIG. 2, operations begin with a processor device of a computing device, computing system, network node, etc., such as the processor device 14 of the network node 10 of FIG. 1. The processor device 14 is to start a first systemd SSM 22-1 while executing a first operating system 18 (block 200). The processor device 14 is further to determine that a first set of computing resources 25 currently available to the processor device 14 lacks a particular computing resource 32 to fulfill a workload 28 (block 202). The processor device 14 is further to use the first systemd SSM 22-1 of the first operating system 18 to establish an encrypted channel 34 to a systemd bus API 36 (block 204). The processor device 14 is further to identify, via the encrypted channel 34, a computing system, or network node such as the computing system 37, executing a second operating system 40 that has the particular computing resource 32 to fulfill the workload 28, wherein the network node is connected to the systemd bus API 36 via a second systemd SSM 22-2 of the second operating system 40 (block 206). The processor device 14 is further to provide configuration information 46 to the second network node via the encrypted channel 34, wherein the configuration information 46 is indicative of at least a portion of the workload 28 to be fulfilled with the particular computing resource (block 208).

Figure 3:
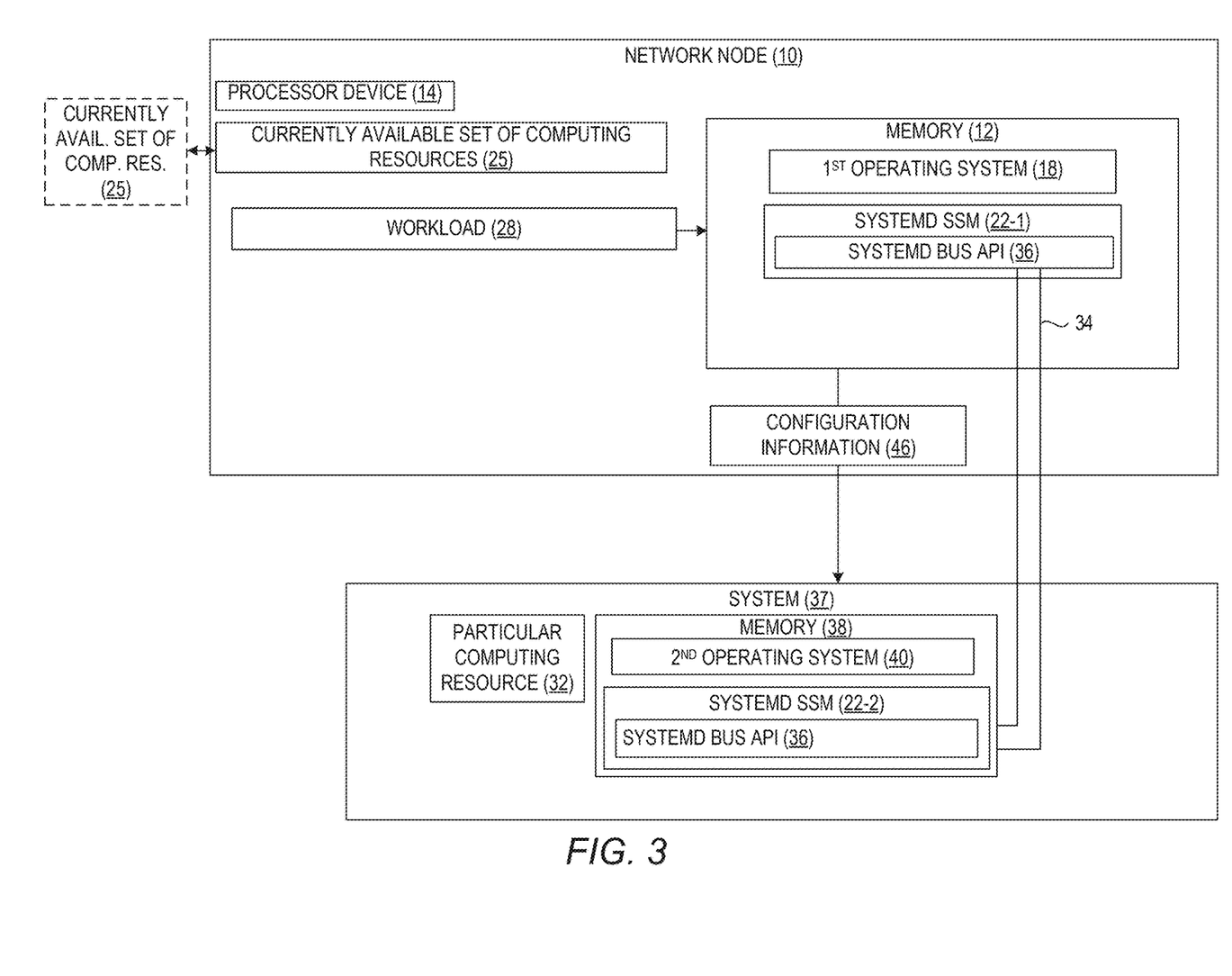
FIG. 3 is a block diagram of the computing device of FIG. 1 for offloading a workload in a resource-constrained environment, according to one example.

FIG. 3 is a block diagram of the computing device of FIG. 1 for offloading a workload in a resource-constrained environment, according to one example. Elements of FIG. 1 are referenced in describing FIG. 3 for the sake of clarity. In the example of FIG. 3, the network node 10 includes a system memory 12, and a processor device 14 coupled to the system memory 12. The processor device 14 is to start, while executing a first operating system 18, a first systemd SSM 22-1 for the first operating system 18. The processor device 14 is further to determine that a first set of currently available computing resources 25 currently available to the network node 10 lacks a particular computing resource 32 to fulfill a workload 28. The processor device 14 is further to use the first systemd SSM 22-1 of the first operating system 18 to establish an encrypted channel 34 to a systemd bus API 36. The processor device 14 is further to identify, via the encrypted channel 34, a second network node or computing system 37 executing a second operating system 40 that has the particular computing resource 32 to fulfill the workload 28. The second network node can be connected to the systemd bus API 36 via a second systemd SSM 22-2 of the second operating system 40. The processor device 14 is further to provide configuration information 46 to the computing system 37 via the encrypted channel 34. The configuration information 46 can be indicative of at least a portion of the workload 28 to be fulfilled with the particular computing resource 32.

Figure 4:
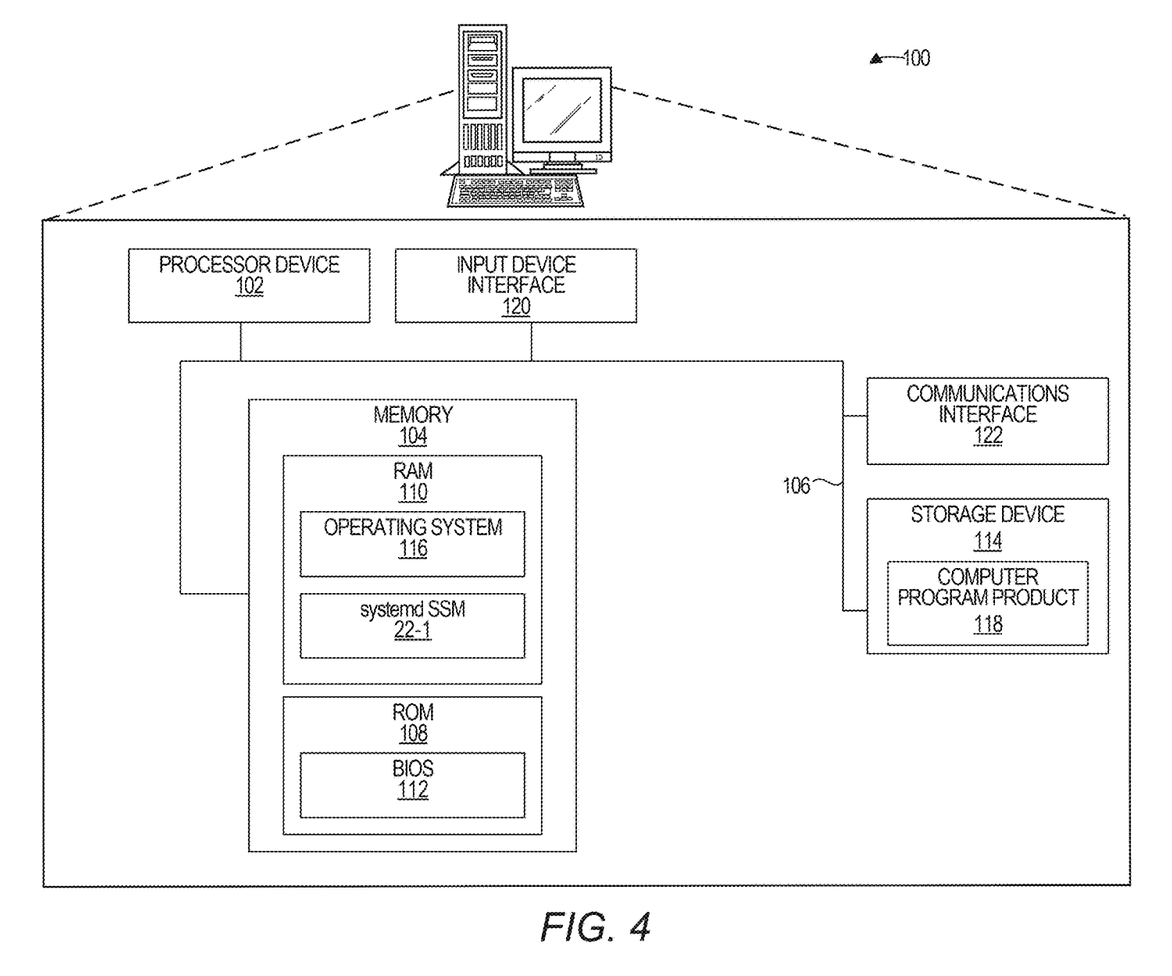
FIG. 4 is a block diagram of a network node, such as the network node of FIG. 1, suitable for implementing examples according to one example.

FIG. 4 is a block diagram of a network node 100, such as the network node 10 of FIG. 1, suitable for implementing examples according to one example. The network node 100 may comprise any computing or electronic device capable of including firmware, hardware, and/or executing software instructions to implement the functionality described herein. The network node 100 includes a processor device 102, such as the processor device 14, a system memory 104, such as the system memory 12, and a system bus 106. The system bus 106 provides an interface for system components including, but not limited to, the system memory 104 and the processor device 102. The processor device 102 can be any commercially available or proprietary processor.

The system bus 106 may be any of several types of bus structures that may further interconnect to a memory bus (with or without a memory controller), a peripheral bus, and/or a local bus using any of a variety of commercially available bus architectures. The system memory 104 may include non-volatile memory 108 (e.g., read-only memory (ROM), erasable programmable read-only memory (EPROM), electrically erasable programmable read-only memory (EEPROM), etc.), and volatile memory 110 (e.g., random-access memory (RAM)). A basic input/output system (BIOS) 112 may be stored in the non-volatile memory 108 and can include the basic routines that help to transfer information between elements within the computing device 100. The volatile memory 110 may also include a high-speed RAM, such as static RAM, for caching data.

The computing device 100 may further include or be coupled to a non-transitory computer-readable storage medium such as a storage device 114, such as the storage device 16, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 114 and other drives associated with computer-readable media and computer-usable media may provide non-volatile storage of data, data structures, computer-executable instructions, and the like.

A number of modules can be stored in the storage device 114 and in the volatile memory 110, including an operating system 116 and one or more program modules, such as the first systemd SSM 22-1, which may implement the functionality described herein in whole or in part. All or a portion of the examples may be implemented as a computer program product 118 stored on a transitory or non-transitory computer-usable or computer-readable storage medium, such as the storage device 114, which includes complex programming instructions, such as complex computer-readable program code, to cause the processor device 102 to carry out the steps described herein. Thus, the computer-readable program code can comprise software instructions for implementing the functionality of the examples described herein when executed on the processor device 102. The processor device 102, in conjunction with the first systemd SSM 22-1 in the volatile memory 110, may serve as a controller, or control system, for the computing device 100 that is to implement the functionality described herein.

An operator, such as a user, may also be able to enter one or more configuration commands through a keyboard (not illustrated), a pointing device such as a mouse (not illustrated), or a touch-sensitive surface such as a display device (not illustrated). Such input devices may be connected to the processor device 102 through an input device interface 120 that is coupled to the system bus 106 but can be connected by other interfaces such as a parallel port, an Institute of Electrical and Electronic Engineers (IEEE) 1394 serial port, a Universal Serial Bus (USB) port, an IR interface, and the like. The computing device 100 may also include a communications interface 122 suitable for communicating with the network as appropriate or desired. The computing device 100 may also include a video port (not illustrated) configured to interface with the display device (not illustrated), to provide information to the user.

Individuals will recognize improvements and modifications to the preferred examples of the disclosure. All such improvements and modifications are considered within the scope of the concepts disclosed herein and the claims that follow.

What is claimed is:

1. A method, comprising:
    starting, by a first network node executing a first operating system, a first systemd System and Service Manager (SSM) for the first operating system;
    determining, by the first network node, that a first set of computing resources currently available to the first network node lacks a particular computing resource to fulfill a particular workload;
    using, by the first network node, the first systemd SSM of the first operating system to establish an encrypted channel to a systemd bus Application Programming Interface (API);
    identifying, by the first network node via the encrypted channel, a second network node executing a second operating system that has the particular computing resource to fulfill the particular workload, wherein the second network node is connected to the systemd bus API via a second systemd SSM of the second operating system; and
    providing, by the first network node, configuration information to the second network node via the encrypted channel, wherein the configuration information is indicative of at least a portion of the particular workload to be fulfilled with the particular computing resource.

2. The method of claim 1, wherein the first network node comprises a Software-Defined Vehicle (SDV), and wherein the second network node comprises a cloud-based compute node.

3. The method of claim 1, wherein identifying the second network node executing the second operating system that has the particular computing resource to fulfill the particular workload comprises:
    sending, by the first network node, information indicative of the particular computing resource to a plurality of network nodes comprising the second network node that are connected to the systemd bus API; and
    responsive to sending the information indicative of the particular computing resource, receiving, by the first network node, information indicative of availability of the particular computing resource at the second network node.

4. The method of claim 3, wherein receiving information indicative of availability of the particular computing resource at the second network node comprises:
    receiving, by the first network node, a systemd bus API signal emitted by an object exposed by the second network node within the systemd bus API, wherein the systemd bus API signal comprises the information indicative of the availability of the particular computing resource at the second network node.

5. The method of claim 4, wherein providing the configuration information to the second network node via the encrypted channel comprises:
    invoking, by the first network node, a method of the object exposed by the second network node, wherein the method of the object exposed by the second network node, when invoked, causes fulfillment of the at least the portion of the particular workload with the particular computing resource.

6. The method of claim 1, wherein the particular computing resource comprises a Graphics Processing Unit (GPU), and wherein the at least the portion of the particular workload comprises:
    a machine-learned model training task; or
    a machine-learned model inference task.

7. The method of claim 1, wherein the second network node comprises an abstract node representation that represents a plurality of distributed network nodes, wherein at least one of the plurality of distributed network nodes comprises the particular computing resource.

8. The method of claim 1, wherein the second network node is associated with a cloud computing service, and wherein providing the configuration information comprises:
    providing, by the first network node, the configuration information to the second network node via the encrypted channel, wherein the configuration information comprises a unit of cloud configuration instructions that, when executed, causes the second network node to instantiate a virtualized instance to perform the at least the portion of the particular workload.

9. The method of claim 8, wherein the configuration information comprises:
one or more inputs for a machine-learned model; and
the unit of cloud configuration instructions that, when executed, causes the second network node to instantiate the virtualized instance, wherein the unit of cloud configuration instructions, when executed, further causes the virtualized instance to:
instantiate an instance of the machine-learned model;
process the one or more inputs for the machine-learned model with the instance of the machine-learned model to obtain a model output; and
provide the model output to the first network node.

10. The method of claim 1, wherein using the first systemd SSM of the first operating system to establish the encrypted channel to the systemd bus API comprises:
providing, by the network node, authenticating information to a managing network node that implements the systemd bus API, wherein the authenticating information identifies the first network node to the managing network node.

11. A first network node, comprising:
a memory; and
a processor device coupled to the memory, the processor device to:
start, while executing a first operating system, a first systemd System and Service Manager (SSM) for the first operating system;
determine that a first set of computing resources currently available to the first network node lacks a particular computing resource to fulfill a particular workload;
use the first systemd SSM of the first operating system to establish an encrypted channel to a systemd bus Application Programming Interface (API);
identify, via the encrypted channel, a second network node executing a second operating system that has the particular computing resource to fulfill the particular workload, wherein the second network node is connected to the systemd bus API via a second systemd SSM of the operating system; and
provide configuration information to the second network node via the encrypted channel, wherein the configuration information is indicative of at least a portion of the particular workload to be fulfilled with the particular computing resource.

12. The first network node of claim 11, wherein the first network node comprises a Software-Defined Vehicle (SDV), and wherein the second network node comprises a cloud-based compute node.

13. The first network node of claim 11, wherein identifying the second network node executing the second operating system that has the particular computing resource to fulfill the particular workload comprises:
sending information indicative of the particular computing resource to a plurality of network nodes comprising the second network node that are connected to the systemd bus API; and
responsive to sending the information indicative of the particular computing resource, receiving information indicative of availability of the particular computing resource at the second network node.

14. The first network node of claim 13, wherein receiving information indicative of availability of the particular computing resource at the second network node comprises:
receiving a systemd bus API signal emitted by an object exposed by the second network node within the systemd bus API, wherein the systemd bus API signal comprises the information indicative of the availability of the particular computing resource at the second network node.

15. The first network node of claim 14, wherein providing the configuration information to the second network node via the encrypted channel comprises:
invoking a method of the object exposed by the second network node, wherein the method of the object exposed by the second network node, when invoked, causes fulfillment of the at least the portion of the particular workload with the particular computing resource.

16. The first network node of claim 11, wherein the particular computing resource comprises a Graphics Processing Unit (GPU), and wherein the at least the portion of the particular workload comprises:
a machine-learned model training task; or
a machine-learned model inference task.

17. The first network node of claim 11, wherein the second network node comprises an abstract node representation that represents a plurality of distributed network nodes, wherein at least one of the plurality of distributed network nodes comprises the particular computing resource.

18. The first network node of claim 11, wherein the second network node is associated with a cloud computing service, and wherein providing the configuration information comprises:
providing the configuration information to the second network node via the encrypted channel, wherein the configuration information comprises a unit of cloud configuration instructions that, when executed, causes the second network node to instantiate a virtualized instance to perform the at least the portion of the particular workload.

19. The first network node of claim 18, wherein the configuration information comprises:
one or more inputs for a machine-learned model; and
the unit of cloud configuration instructions that, when executed, causes the second network node to instantiate the virtualized instance, wherein the unit of cloud configuration instructions, when executed, further causes the virtualized instance to:
instantiate an instance of the machine-learned model;
process the one or more inputs for the machine-learned model with the instance of the machine-learned model to obtain a model output; and
provide the model output to the first network node.

20. A non-transitory computer-readable storage medium that includes computer-executable instructions that, when executed, cause one or more processor devices of a first network node to:
start, while executing a first operating system, a first systemd System and Service Manager (SSM) for the first operating system;
determine that a first set of computing resources currently available to the first network node lacks a particular computing resource to fulfill a particular workload;
use the first systemd SSM of the first operating system to establish an encrypted channel to a systemd bus Application Programming Interface (API);
identify, via the encrypted channel, a second network node executing a second operating system that has the particular computing resource to fulfill the particular workload, wherein the second network node is connected to the systemd bus API via a second systemd SSM of the second operating system; and provide configuration information to the second network node via the encrypted channel, wherein the configuration information is indicative of at least a portion of the particular workload to be fulfilled with the particular computing resource.

\* \* \* \* \*